United States Patent Office 2,972,329
Patented Feb. 21, 1961

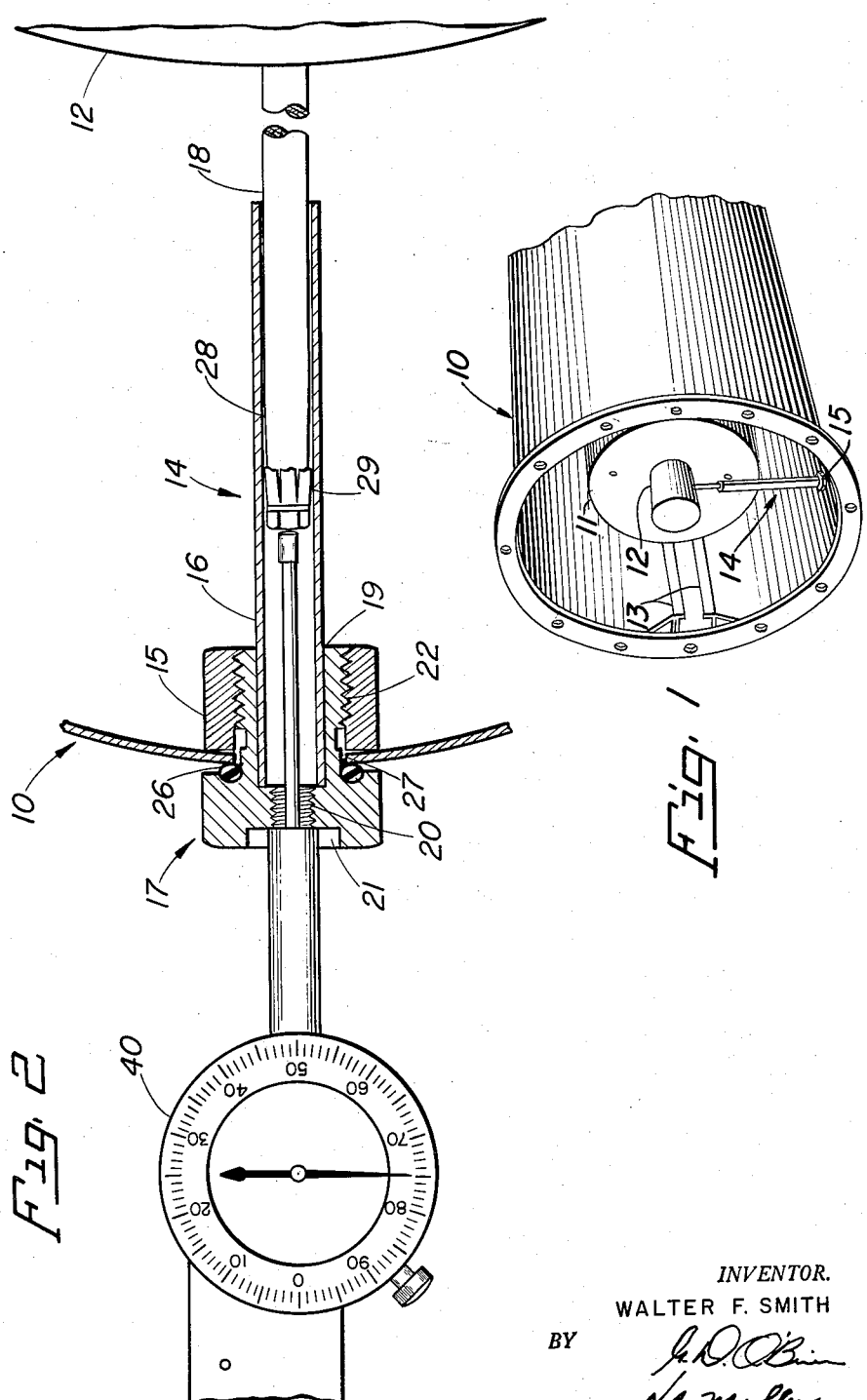

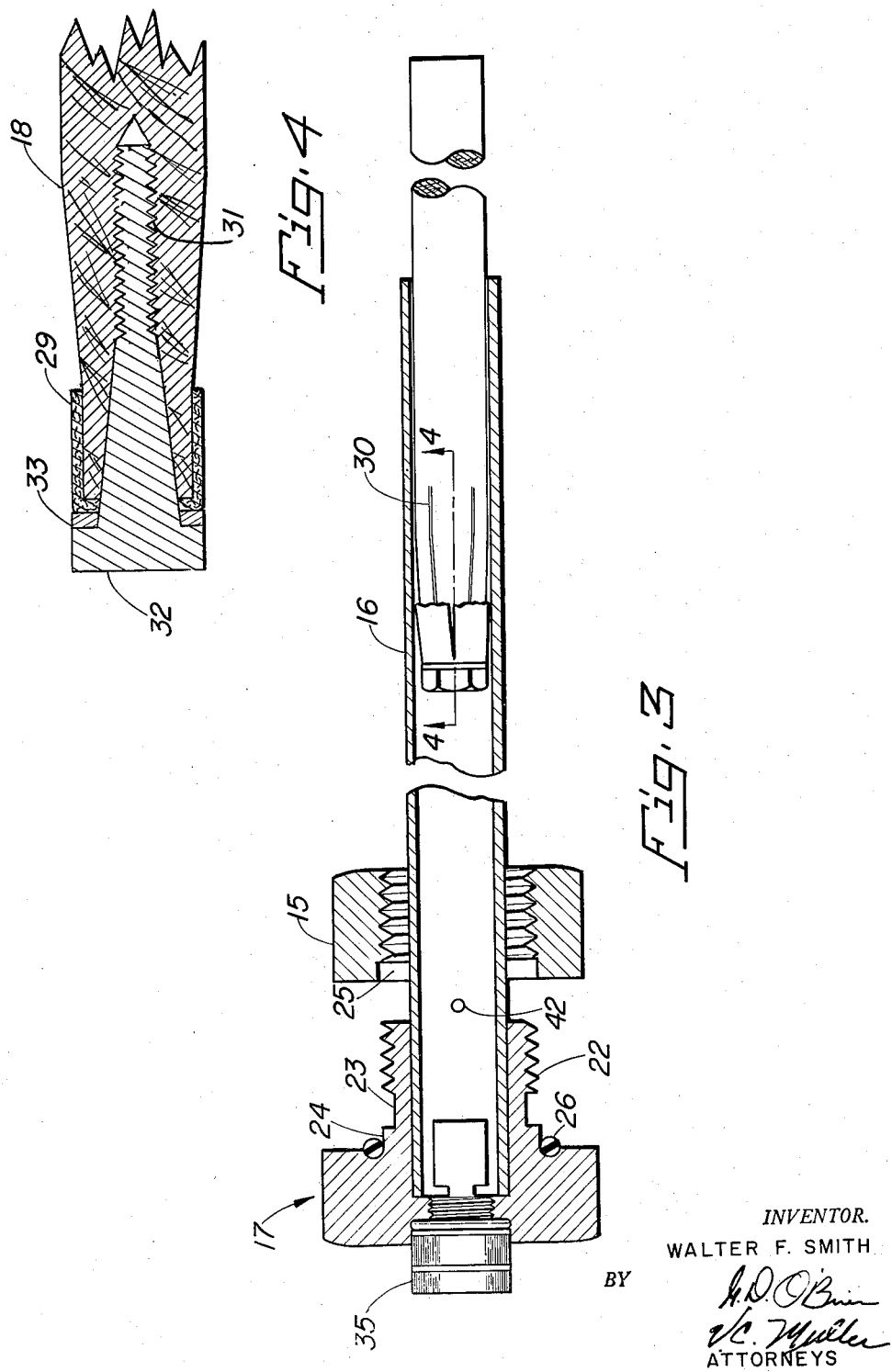

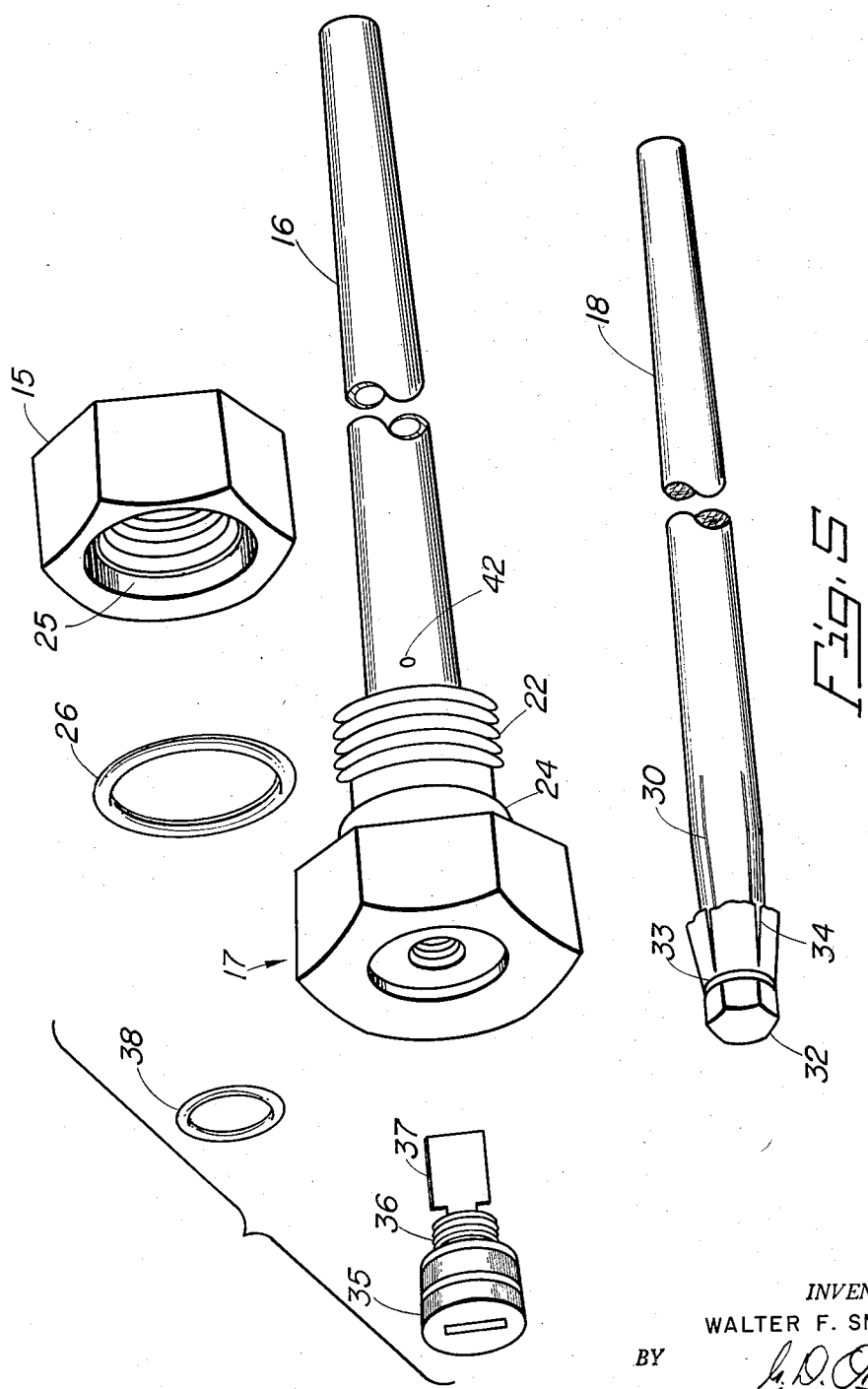

2,972,329

APPARATUS FOR INDICATING DYNAMIC DISPLACEMENT

Walter F. Smith, Alta Loma, Calif., assignor to the United States of America as represented by the Secretary of the Navy Filed Apr. 1, 1958, Ser. No. 725,764

8 Claims. (Cl. 116—114)

(Granted under Title 35, U.S. Code (1952), sec. 266)

The invention described herein may be manufactured and used by or for the Government of the United States of America for governmental purposes without the payment of any royalties therein or therefor.

The present invention relates to an apparatus for dynamic displacement measuring, generally speaking, and has more particular reference to a practical and reliable apparatus, when employed, to measure the maximum displacement of an article inside a container resulting from different impacts received during shipping and handling.

Many articles packaged for shipment today are either fragil or delicate in nature and severe shocks received during shipment result in damage to the article. The present invention, therefor, relates to a novel means for accurately measuring the maximum displacement of the article from its normal secured position inside the package. By using the teachings of the present invention it is possible to determine if damage to the packaged article is due to faulty handling of the article while in transit. Also it is possible to determine which one of a plurality of sequential handling operations produced the severest impacts on the packaged article.

There is no known method or apparatus in the prior art of measuring accurately this displacement. The only prior method known was to calculate the displacements from results of other tests which gave the natural frequency, weight and height of the article being shipped. This old method obviously meant more elaborate instrumentation using electronic equipment, wiring and transducers, all of which contributed to some errors in the measurements.

One preferred embodiment for carrying out the present invention comprises a length of dural tubing secured by a suitable mounting base to the periphery of a shipping container, a dowel plunger inserted in the tubing and acting as a piston in said tubing and having its exposed end abutted against the article being shipped. The dowel plunger has a taper on the end inserted in the tubing with a leather cup secured to said end for adjusting the frictional engagement between the plunger and the tubing for different applications. The tubing has an open end projecting beyond the skin of the shipping container and is adapted ot receive a depth gauge therein to measure the displacement of the plunger in the tubing before and after shipping or handling. A plug is screwed into the open end of the tubing during shipping and handling of the packaged article. A flag is mounted on the end of the plug inserted in the tubing and the initial depth reading is recorded on the flag prior to shipping.

It is the object of this invention to provide an apparatus by means of which the maximum displacement of an article inside a shipping container due to different impacts can be accurately determined.

Another object is to provide an apparatus to measure accurately, without complicated equipment and calculations, the displacement of an article in a package due to impacts received by the package when handled and shipped.

Other objects and many of the attendant advantages of this invention will be readily appreciated as the same becomes better understood by reference to the following detailed description when considered in connection with the accompanying drawings wherein:

Fig. 1 is a perspective open end view of a cylindrical shipping receptacle having the preferred embodiment mounted therein;

Fig. 2 is a cross sectional view taken along the center line of the tubing with a depth gauge inserted in the open end of the tubing;

Fig. 3 is a cross sectional view of the device taken along the center line of the tubing with the end plug and flag inserted therein;

Fig. 4 is a cross-sectional view taken on the line 4—4 of Fig. 3; and

Fig. 5 is a perspective view of the various components of the indicator.

Referring now to the drawings by way of reference numerals and accompanying lead lines with particular reference to Fig. 1, a cylindrical article 11 is secured inside a cylindrical shipping container 10 by means (not shown) to the ribs 13 of the container. The article 11 has a reduced end portion 12 projecting toward the open end of the container 10. The preferred embodiment of the invention, indicator 14, is secured to the receptacle 10 by the nut 15.

As shown in Figs. 2–5 the displacement indicator 14 comprises a piece of tubing 16, a base member 17 and a dowel plunger or piston member 18. The base member 17 has a longitudinally extending bore of different diameters as indicated at 19, 20 and 21. The bore 19 opens at one end of the base member 17 and the larger bore 21 is connected by the bore 20 to the bore 19 and terminates at the opposite end of said base member. The bore 19 is of such diameter as to receive one end of tubing 16 and the base member and tubing are secured together by a press fit or other common mechanical expedients. The reduced bore portion 20 is threaded internally for purposes hereinafter disclosed. The end of base member 17 having bore 19 therein has external threads 22 and the nut 15 is threaded thereon to hold the indicator 14 on the container 10. The member 17 has a reduced external portion 23 and a slightly enlarged shoulder portion 24 adapted to be received within the recessed portion 25 of the nut 15 so that the nut 15, O-ring 26 and base member 17 hermetically seal the opening 27 in the receptacle 10.

The tubing 16 has a bore 28 designed to receive the dowel plunger 18 which is reciprocally mounted therein and is provided with a leather cup 29 on its inner end. The plunger 18 extends from within the free end of the tubing 16 and abuts against the reduced end portion 12 at the initial setting of the indicator.

Referring to Figs. 3 and 4, the dowel plunger 18 is tapered at its inner end and has a plurality of slots 30 cut therein. A bore 31 in the inner end of the plunger 18 receives a tapered bolt 32 therein to provide a means of friction adjustment needed in different applications as hereafter described. A washer 33 abuts against the head of the bolt 32 and provides a seat for the leather cup 29. The cup 29 also has a plurality of slots 34 cut from its top and terminating near its bottom. As can readily be seen the amount of frictional engagement between the leather cup 29 and the bore 28 can be adjusted by turning the bolt 32 in the bore 31 and either increasing or decreasing the overall circumference of the split tapered end of the plunger as tapered bolt 32 respectively moves inwardly or outwardly of the bore 31.

A plug 35 having a reduced threaded end portion 36 is adapted to fit into the threaded portion 20 of the base member 17 when the receptacle is in transit or in storage and readings are not being taken on the displacement of the plunger in the tubing. A flag 37 is mounted on the reduced end portion 36 and is inserted in the bore 28 when the plug 35 is inserted in the base member 17. An O-ring 38 forms an hermetical seal for the bore 20 when the plug 35 is in place in the member 17.

In the application and operation of the disclosed embodiment the indicator 14 is rigidly secured to the shipping container 10 by the nut 15 in the manner shown in Fig. 2. The dowel plunger 18 is moved into contact with end portion 12 and an initial reading is taken by a device, such as depth gauge 40 shown in Fig. 2 or other suitable means. The initial depth gauge reading is recorded on the flag 37, the depth gauge removed from within the indicator 14 and the plug 35 is inserted in the base member 17 and secured in place by a suitable tool (not shown). It is understood, of course, that the tapered bolt 32 and leather cup 29 are adjusted, prior to the assembly of the device, to give the minimum amount of friction needed to prevent overshoot of the plunger due to inertia of the plunger during the most severe condition that can be expected during the handling of the packaged article. When the container and article have reached their destination after shipment, and at such other times as desired, the plug 35 is removed from the base member 17 and a depth gauge is inserted to take a new reading to determine the displacement of the article 11 in the receptacle due to shocks and impacts on the receptacle received in transit. An air exhaust port 42 is provided in the tubing 16 adjacent the end inserted in the base member 17. The purpose of the exhaust port 42 is to allow escapement of air trapped in the chamber formed by the tubing 16, plunger 18 and plug 35 and prevent rebound of the plunger at the end of long fast displacements.

It is to be understood that the above described embodiment is merely one illustration and example of how the invention may be carried out. The invention may be practiced by any means which is capable of being mounted inside a container or receptacle, said means having a moveable part abutted against an article packaged in the container, a second means for frictionally holding the moveable part in any displaced position, and any suitable means for measuring the displacement of the moveable part after the container and article have been handled or shipped and received severe shocks or impacts. Also the design of the dynamic displacement indicator would have to conform to various types of shipping receptacles, i.e. boxes, open crates, metal hoppers, barrels, etc., which would be readily apparent to one skilled in the art once the teaching of the instant invention is before him.

Obviously many modifications and variations of the present invention are possible in the light of the above teachings. It is therefore understood that within the scope of the appended claims the invention may be practiced otherwise than as specifically described.

What is claimed is:

1. A displacement measuring device for packaged articles including in combination a container, an article secured inside said container, a first means in contact with said article and responsive to impacts received by said article to effect displacement of said first means, an enclosure mounted on said container and housing one end of said first means, an adjustable friction means between said one end of said first means and said enclosure for retaining said first means in said enclosure in its original and displaced positions, means for measuring the relative position of said one end inside said enclosure for recording the initial measurement for comparison with later measurements whereby the displacement of the article in the container due to external impacts is easily determined.

2. Apparatus for measuring the displacement of an article inside a shipping receptacle due to external impacts comprising: a base member adapted to be mounted on said receptacle, a cylinder connected to said base member and projecting toward said article, a piston member operable in said cylinder and in contact with said article whereby movement of the article relative to the receptacle will displace the piston member in said cylinder, means for measuring the relative positions of said piston member in said cylinder for recording the initial measured position of said piston member for comparison with later measurements.

3. The apparatus of claim 2 in which said base member has a threaded bore therein, a plug member adapted to be inserted in said bore, and a flag mounted on said plug member for recording depth readings thereon.

4. The apparatus of claim 2 including adjustable friction means between said piston member and said cylinder comprising a slotted portion at one end of said piston member, a tapered bore in said end, a tapered bolt inserted in said bore, a washer on said bolt and a slotted leather cup seated on said washer and enclosing the slotted end of said piston member whereby the friction between said piston member and said cylinder can be adjusted.

5. A dynamic displacement device including, in combination, a container, an article mounted for shipment inside said container, a base member secured to the periphery of said container and projecting inwardly therefrom, a bore extending longitudinally through said base member, a cylinder having one end inserted in said base member and projecting into said container, a piston member having one end thereof housed within said cylinder and the other end in contact with said article whereby movement of the article relative to said container will displace one end of the piston member in said cylinder for measuring the displacement of said article in said container due to external impacts, an adjustable friction member connected to the end of said piston member inserted in said cylinder to prevent overshoot of said piston member due to inertia.

6. A dynamic displacement device as set forth in claim 5 wherein the bore of said base member has a threaded portion adapted to receive a plug member therein.

7. The device of claim 6 in which a flag is mounted on said plug member for recording depth readings thereon and said flag is insertable in said bore during handling of said container.

8. The device of claim 5 is which said one end of said piston member is slotted and has a tapered bore therein and said adjustable friction member comprises; a tapered bolt inserted in said tapered bore, a washer on said bolt and a slotted leather cup seated on said washer and enclosing the slotted end of said piston member whereby the friction between said piston member and said cylinder can be adjusted.

References Cited in the file of this patent

UNITED STATES PATENTS 2,601,440     Kerrigan _____ June 24, 1952

FOREIGN PATENTS 1,046,955     France _____ July 15, 1953